United States Patent
Sabripour et al.

(10) Patent No.: US 11,762,082 B2
(45) Date of Patent: Sep. 19, 2023

(54) METHOD, SYSTEM AND COMPUTER PROGRAM PRODUCT FOR INTELLIGENT TRACKING

(71) Applicant: MOTOROLA SOLUTIONS, INC., Chicago, IL (US)

(72) Inventors: Shervin Sabripour, Plantation, FL (US); John B Preston, Plantation, FL (US); Bert Van Der Zaag, Wheat Ridge, CO (US); Patrick D Koskan, Juipiter, FL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 3 days.

(21) Appl. No.: 17/647,117

(22) Filed: Jan. 5, 2022

(65) Prior Publication Data

US 2022/0128683 A1    Apr. 28, 2022

Related U.S. Application Data

(63) Continuation of application No. 16/723,958, filed on Dec. 20, 2019, now Pat. No. 11,243,305.

(51) Int. Cl.
| | |
|---|---|
| *G01S 13/86* | (2006.01) |
| *G01S 13/70* | (2006.01) |
| *G06T 7/246* | (2017.01) |
| *G06T 7/00* | (2017.01) |
| *G06V 40/16* | (2022.01) |
| *G06F 18/2431* | (2023.01) |
| *G06V 20/52* | (2022.01) |

(52) U.S. Cl.
CPC ............ *G01S 13/867* (2013.01); *G01S 13/70* (2013.01); *G06F 18/2431* (2023.01); *G06T 7/0002* (2013.01); *G06T 7/246* (2017.01); *G06V 20/52* (2022.01); *G06V 40/172* (2022.01); *G06T 2207/20212* (2013.01)

(58) Field of Classification Search
CPC .... G01S 13/867; G06V 20/52; G06V 40/172; G06T 2207/10016; G06T 2207/10028; G06T 2207/30196; G06T 2207/30232; G06T 2207/30241; G06T 7/292
See application file for complete search history.

(56) References Cited

U.S. PATENT DOCUMENTS

| | | | |
|---|---|---|---|
| 3,180,107 A1 | 5/2012 | Broaddus et al. | |
| 9,213,090 B2 | 12/2015 | Paoletti | |
| 9,600,992 B1 * | 3/2017 | Kolla | ................. G08B 13/1427 |
| 10,421,437 B1 | 9/2019 | Koskan | |
| 10,696,272 B2 | 6/2020 | Salter et al. | |
| 10,776,672 B2 * | 9/2020 | Doumbouya | ............. G06T 7/70 |

(Continued)

FOREIGN PATENT DOCUMENTS

EP    1810052 B1    1/2018

*Primary Examiner* — Wesley J Tucker
(74) *Attorney, Agent, or Firm* — Daniel R. Bestor

(57) ABSTRACT

A method, system and computer program product for intelligent tracking and transformation between interconnected sensor devices of mixed type is disclosed. Metadata derived from image data from a camera is compared to different metadata derived from radar data from a radar device to determine whether an object in a Field of View (FOV) of one of the camera and the radar device is an identified object that was previously in the FOV of the other of the camera and the radar device.

17 Claims, 5 Drawing Sheets

(56) References Cited

U.S. PATENT DOCUMENTS

| | | | |
|---|---|---|---|
| 10,859,693 B1 | 12/2020 | Sabripour et al. | |
| 10,867,494 B2* | 12/2020 | Koskan | G08B 5/36 |
| 10,977,826 B1* | 4/2021 | Russo | E05F 15/73 |
| 2010/0073363 A1* | 3/2010 | Densham | G05B 17/02 |
| | | | 718/1 |
| 2010/0157064 A1 | 6/2010 | Cheng et al. | |
| 2010/0208941 A1 | 8/2010 | Broaddus et al. | |
| 2015/0332476 A1 | 11/2015 | Park et al. | |
| 2016/0306036 A1* | 10/2016 | Johnson | G06T 7/254 |
| 2016/0307420 A1 | 10/2016 | Delean | |
| 2018/0157916 A1 | 6/2018 | Doumbouya et al. | |
| 2019/0007797 A1 | 1/2019 | Folco et al. | |
| 2019/0294889 A1 | 9/2019 | Sriram et al. | |
| 2019/0332901 A1 | 10/2019 | Doumbouya et al. | |
| 2019/0333233 A1* | 10/2019 | Hu | G06V 10/255 |
| 2020/0074245 A1 | 3/2020 | Koskan et al. | |

\* cited by examiner

METHOD, SYSTEM AND COMPUTER PROGRAM PRODUCT FOR INTELLIGENT TRACKING

CROSS REFERENCE TO RELATED APPLICATION

This application claims the priority to and is a continuation of U.S. application Ser. No. 16/723,958, filed Dec. 20, 2019, the contents of which are incorporated herein by reference in their entirety.

BACKGROUND

Radar devices are used in a wide variety of different industries. One example of these industries is the security industry. For instance, in the security industry a radar device can sometimes be chosen over a video camera in certain locations like ATMs, change rooms, etc. where privacy concerns weigh against capturing traditional video images. Also, radar devices tend to work well under any light conditions, and some radar devices may facilitate a cheaper cost for providing security coverage over a defined area relative to certain potential video camera substitutes.

BRIEF DESCRIPTION OF THE SEVERAL VIEWS OF THE DRAWINGS

In the accompanying figures similar or the same reference numerals may be repeated to indicate corresponding or analogous elements. These figures, together with the detailed description, below are incorporated in and form part of the specification and serve to further illustrate various embodiments of concepts that include the claimed invention, and to explain various principles and advantages of those embodiments.

Figure 1:
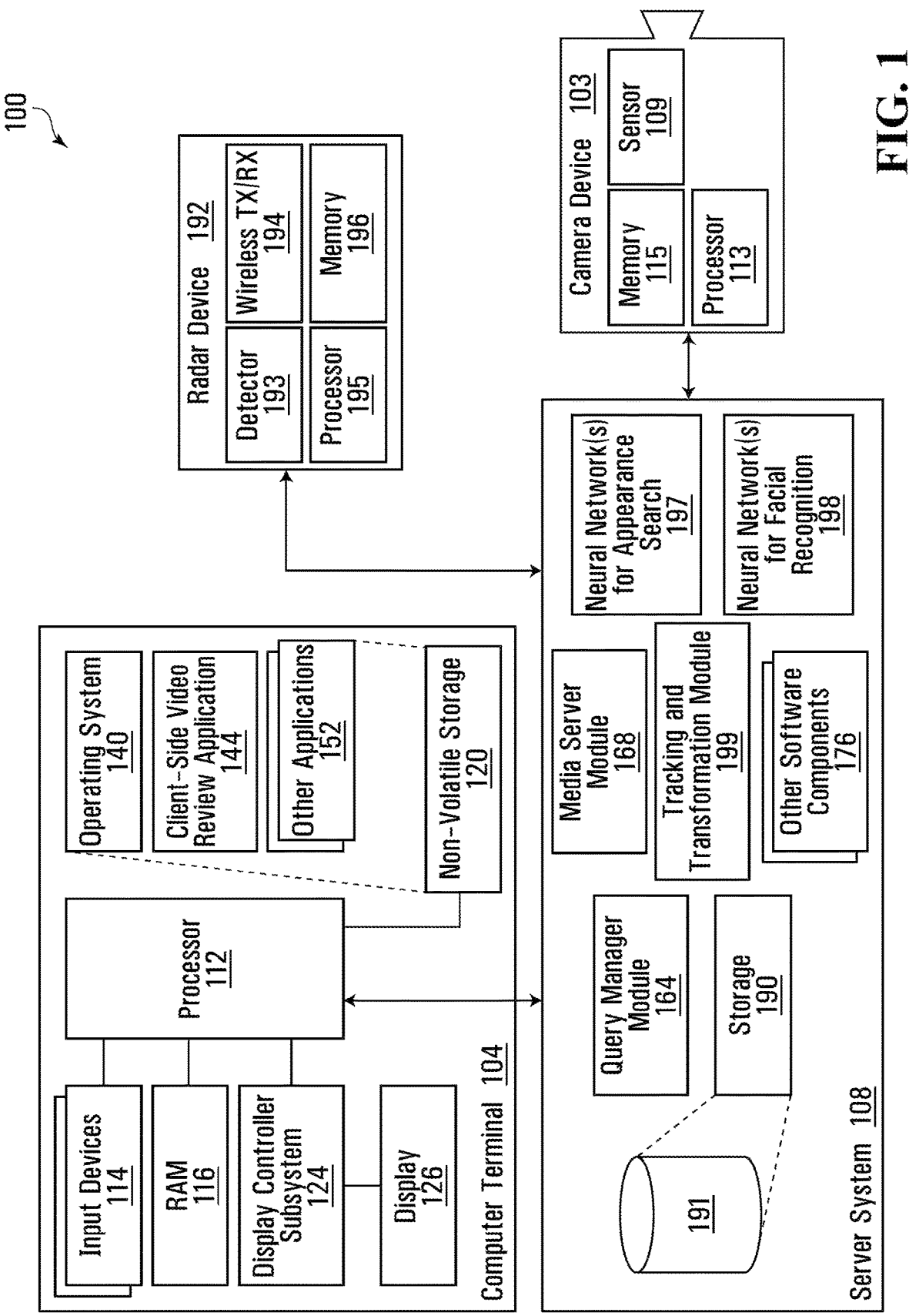
FIG. 1 shows a block diagram of an example security system within which methods in accordance with example embodiments can be carried out.

Skilled artisans will appreciate that elements in the figures are illustrated for simplicity and clarity and have not necessarily been drawn to scale. For example, the dimensions of some of the elements in the figures may be exaggerated relative to other elements to help improve understanding of embodiments of the present disclosure.

The apparatus and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION OF THE INVENTION

According to one example embodiment, there is provided a system that includes a calibrated camera device that is configured to: generate image data to track a movement of an identified object during a period of time; and, upon detection that the identified object is exiting across or has exited across a tracking boundary of the calibrated camera device, update a track to add first metadata that includes, in respect of the identified object, at least an exit position, an exit motion vector and object classification data of a first type. The system also includes a calibrated radar device that is configured to detect that a new object is entering across or has entered across a tracking boundary of the calibrated radar device adjacent the tracking boundary of the calibrated camera device. The detecting includes capturing second metadata that includes an entry position, an entry motion vector and an object classification data of a second type. The object classification data of the second type is inherently of a coarser granularity than the object classification data of the first type. The radar device is also configured to: carry out a comparison, between at least the first metadata and the second metadata, to determine whether the new object is the identified object; and further update the track to include both the first and second metadata together as transformed hybrid data when the new object is determined to be the identified object.

According to another example embodiment, there is provided a method that includes generating image data to track a movement of an identified object, within a field of view of a calibrated camera device, during a period of time. Upon detection that the identified object is exiting across or has exited across a tracking boundary of the calibrated camera device, a track is updated to add first metadata that includes, in respect of the identified object, at least an exit position, an exit motion vector and object classification data of a first type. The method also includes detecting that a new object is entering across or has entered across a tracking boundary of a calibrated radar device adjacent the tracking boundary of the calibrated camera device. The detecting includes capturing second metadata that includes an entry position, an entry motion vector and an object classification data of a second type. The object classification data of the second type is inherently of a coarser granularity than the object classification data of the first type. The method also includes carrying out a comparison, between at least the first metadata and the second metadata, to determine whether the new object is the identified object. The track is further updated to include both the first and second metadata together as transformed hybrid data when the new object is determined to be the identified object.

According to yet another example embodiment, there is provided a system that includes a calibrated radar device that is configured to: generate radar data to track a movement of an identified object during a period of time; and, upon detection that the identified object is exiting across or has exited across a tracking boundary of the calibrated radar device, update a track to add first metadata that includes, in respect of the identified object, at least an exit position, an exit motion vector and object classification data of a first type. The system also includes a calibrated camera device that is configured to detect that a new object is entering across or has entered across a tracking boundary of the calibrated camera device adjacent the tracking boundary of the calibrated radar device. The detecting includes capturing second metadata that includes an entry position, an entry motion vector and an object classification data of a second. The object classification data of the first type is inherently of a coarser granularity than the object classification data of the second type. The calibrated camera device is also configured to: carry out a comparison, between at least the first metadata and the second metadata, to determine whether the new object is the identified object; and further update the track to include both the first and second metadata together as transformed hybrid data when the new object is determined to be the identified object.

According to yet another example embodiment, there is provided a method that includes generating radar data to track a movement of an identified object, within a coverage area of a calibrated radar device, during a period of time. Upon detection that the identified object is exiting across or has exited across a tracking boundary of the calibrated radar device, a track is updated to add first metadata that includes, in respect of the identified object, at least an exit position, an exit motion vector and object classification data of a first type. The method also includes detecting that a new object is entering across or has entered across a tracking boundary of a calibrated camera device adjacent the tracking boundary of the calibrated radar device. The detecting includes capturing second metadata that includes an entry position, an entry motion vector and an object classification data of a second type, wherein the object classification data of the first type is inherently of a coarser granularity than the object classification data of the second type. The method also includes carrying out a comparison, between at least the first metadata and the second metadata, to determine whether the new object is the identified object. The track is further updated to include both the first and second metadata together as transformed hybrid data when the new object is determined to be the identified object.

According to yet another embodiment, there is provided a system that includes a system that includes a first radar device that is calibrated. The first radar device is configured to: generate first radar data to track a movement of an identified object during a period of time; and, upon detection that the identified object is exiting across or has exited across a tracking boundary of the first radar device, update a track to add first metadata that includes, in respect of the identified object, at least an exit position, an exit motion vector and first object classification data. The system also includes a second radar device that is calibrated as well. The second radar device is configured to: detect that a new object is entering across or has entered across a tracking boundary of the first radar device adjacent the tracking boundary of the second radar device. The detecting includes capturing second metadata that includes an entry position, an entry motion vector and second object classification data. The second radar device is also configured to: carry out a comparison, between at least the first metadata and the second metadata, to determine whether the new object is the identified object; and further update the track to include both the first and second metadata together as transformed data when the new object is determined to be the identified object.

Each of the above-mentioned embodiments will be discussed in more detail below, starting with example system and device architectures of the system in which the embodiments may be practiced, followed by an illustration of processing blocks for achieving an improved technical method, device, and system for intelligent tracking, metadata transformation and inter-device communication between interconnected sensor devices of mixed type.

As will be appreciated by those skilled in the art, non-overlapping camera tracking systems have limitations. For example, these types of systems may be inherently inaccurate when the cameras employed therein are widely separated. These types of system may also provide opportunities for people to linger or move in unexpected ways that the system might be incapable of handling (i.e. issues relating to too much time elapsing, too many exit/entrance points, etc.). Systems in accordance with a number of example embodiments herein described may alleviate at least some of these problems and concerns.

Example embodiments are herein described with reference to, for instance, flowchart illustrations and/or block diagrams. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks. It is contemplated that any part of any aspect or embodiment discussed in this specification can be implemented or combined with any part of any other aspect or embodiment discussed in this specification.

The term "object" as used herein is understood to have the same meaning as would normally be given by one skilled in the art of video analytics, and examples of objects may include humans, vehicles, animals, etc.

Further advantages and features consistent with this disclosure will be set forth in the following detailed description, with reference to the figures.

Reference is now made to FIG. 1 which shows a block diagram of an example security system 100 within which methods in accordance with example embodiments can be carried out. Included within the illustrated security system 100 are one or more computer terminals 104 and a server system 108. In some example embodiments, the computer terminal 104 is a personal computer system; however in other example embodiments the computer terminal 104 is a selected one or more of the following: a handheld device such as, for example, a tablet, a phablet, a smart phone or a personal digital assistant (PDA); a laptop computer; a smart television; and other suitable devices. With respect to the server system 108, this could comprise a single physical machine or multiple physical machines. It will be understood that the server system 108 need not be contained within a single chassis, nor necessarily will there be a single location for the server system 108. As will be appreciated by those skilled in the art, at least some of the functionality of the server system 108 can be implemented within the computer terminal 104 rather than within the server system 108.

The computer terminal 104 communicates with the server system 108 through one or more networks. These networks can include the Internet, or one or more other public/private networks coupled together by network switches or other communication elements. The network(s) could be of the form of, for example, client-server networks, peer-to-peer networks, etc. Data connections between the computer terminal 104 and the server system 108 can be any number of known arrangements for accessing a data communications network, such as, for example, dial-up Serial Line Interface Protocol/Point-to-Point Protocol (SLIP/PPP), Integrated Services Digital Network (ISDN), dedicated lease line service, broadband (e.g. cable) access, Digital Subscriber Line (DSL), Asynchronous Transfer Mode (ATM), Frame Relay, or other known access techniques (for example, radio frequency (RF) links). In at least one example embodiment, the computer terminal 104 and the server system 108 are within the same Local Area Network (LAN).

The computer terminal 104 includes at least one processor 112 that controls the overall operation of the computer terminal. The processor 112 interacts with various subsystems such as, for example, input devices 114 (such as a selected one or more of a keyboard, mouse, touch pad, roller ball and voice control means, for example), random access memory (RAM) 116, non-volatile storage 120, display controller subsystem 124 and other subsystems. The display controller subsystem 124 interacts with display 126 and it renders graphics and/or text upon the display 126.

Still with reference to the computer terminal 104 of the security system 100, operating system 140 and various software applications used by the processor 112 are stored in the non-volatile storage 120. The non-volatile storage 120 is, for example, one or more hard disks, solid state drives, or some other suitable form of computer readable medium that retains recorded information after the computer terminal 104 is turned off. Regarding the operating system 140, this includes software that manages computer hardware and software resources of the computer terminal 104 and provides common services for computer programs. Also, those skilled in the art will appreciate that the operating system 140, client-side video review application 144, and other applications 152, or parts thereof, may be temporarily loaded into a volatile store such as the RAM 116. The processor 112, in addition to its operating system functions, can enable execution of the various software applications on the computer terminal 104.

Figure 2:
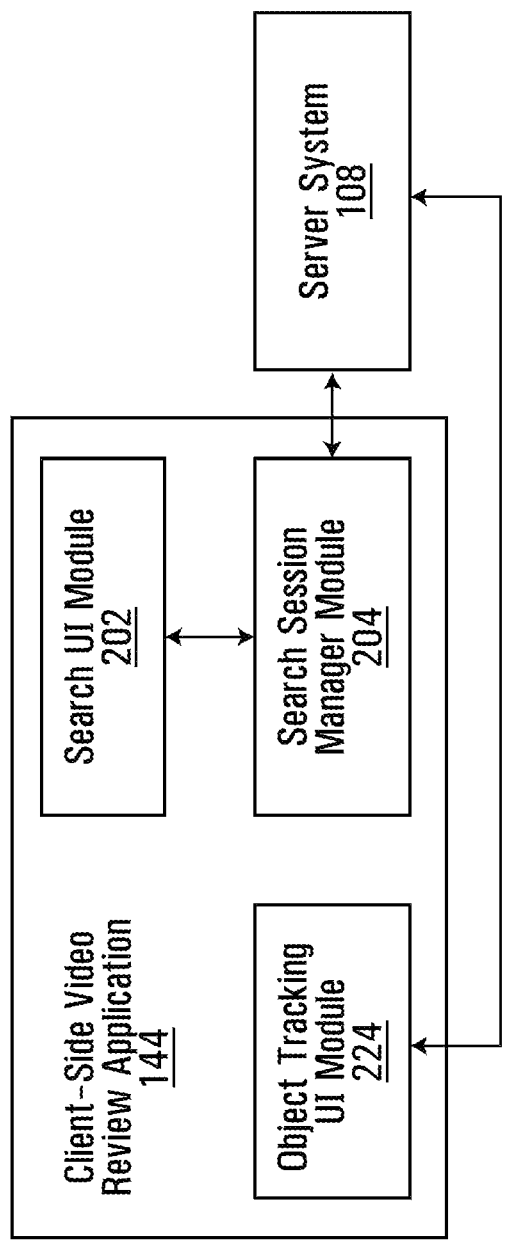
FIG. 2 shows a block diagram of a client-side video review application, in accordance with certain example embodiments, that can be provided within the example security system of FIG. 1.

Example details of the video review application 144, beyond those already described, are shown in the block diagram of FIG. 2 (provided herein for illustrative purposes without intending to comprehensive detail all typical aspects of the video review application 144). The video review application 144 can be run on the computer terminal 104 and includes a search User Interface (UI) module 202 for cooperation with a search session manager module 204 in order to enable a computer terminal user to carry out actions related to providing input in relation images, live video and video recordings (such as, for example, input to facilitate identifying same individuals or objects appearing in a plurality of different video recordings).

The video review application 144 also includes the search session manager module 204 mentioned above. The search session manager module 204 provides a communications interface between the search UI module 202 and a query manager module 164 (FIG. 1) of the server system 108. In at least some examples, the search session manager module 204 communicates with the query manager module 164 through the use of Remote Procedure Calls (RPCs). The query manager module 164 receives and processes queries originating from the computer terminal 104, which may facilitate retrieval and delivery of specifically defined video and radar data (and respective metadata) in support of, for example, client-side video review, video export, managing event detection, etc.

The video review application 144 also includes an object tracking UI module 224. The object tracking UI module 224 is communicatively coupled to a tracking and transformation module 199 found on the server-side (i.e. within the server system 108). Further details regarding the object tracking UI module 224 and the tracking and transformation module 199 are explained subsequently herein in greater detail.

Referring once again to FIG. 1, the server system 108 includes several software components (besides the query manager module 164 already described) for carrying out other functions of the server system 108. For example, the server system 108 includes a media server module 168 (FIG. 1). The media server module 168 handles client requests related to storage and retrieval of security video taken by video cameras 169 in the security system 100. The server system 108 also includes one or more conventional neural networks 197 for appearance searching (i.e. to provide artificial intelligence functionality in support of, for example, appearance searches controlled within the video review application 144). The server system 108 also includes one or more conventional neural networks 198 for facial recognition (i.e. to provide artificial intelligence functionality in support of, for example, facial recognition controlled within the video review application 144).

The server system 108 also includes a number of other software components 176. These other software components will vary depending on the requirements of the server system 108 within the overall system. As just one example, the other software components 176 might include special test and debugging software, or software to facilitate version updating of modules within the server system 108. As another example of the other software components 176 may include an analytics engine component. The analytics engine component can, in some examples, be any suitable one of known commercially available software that carry out computer vision related functions as understood by a person of skill in the art.

The server system 108 also includes one or more data stores 190. In some examples, the data store 190 comprises one or more databases 191 which may facilitate the organized storing of recorded security video, point cloud-related data, etc. in accordance with example embodiments. The one or more databases 191 may also contain metadata related to, for example, the recorded security video (and other sensor data including radar data) storable within one or more data stores 190. In at least one non-limiting example, metadata is stored in JSON files. It is also contemplated that the one or more databases 191 may also contain tracks. As will be appreciated by those skilled in the art, "tracks" are created in tracking, where each track encompasses one grouping of all detections pertaining to a same tracked object and each track is uniquely identifiable.

Examples of metadata that may be expected to be derived directly or indirectly from video data include location in field of view, object ID, bounding box-related data, tracking position relative to field of view, other object-related video metadata (such as, for example, type, fine classification), etc. Examples of metadata that may be expected to be derived directly or indirectly from radar data include direction, range/distance, velocity, angle of approach, direction of motion, other object-related radar metadata (such as, for example, type, coarse classification), etc. In accordance with some example embodiments, the one or more databases 191 contain transformed hybrid metadata, the details and nature of which are later herein explained in more detail.

The illustrated security system 100 includes at least one calibrated camera device 103 (hereinafter interchangeably referred to as a "camera 103") being operable to capture a plurality of images and produce image data representing the plurality of captured images. The camera 103 is an image capturing device and includes security video cameras. Furthermore, although only one camera 103 is shown in FIG. 1 for convenience of illustration, it will be understood that any suitable number of cameras 103 may be included within the security system 100.

The camera 103 includes an image sensor 109 for capturing a plurality of images. The camera 103 may be a digital video camera and the image sensor 109 may output captured light as a digital data. For example, the image sensor 109 may be a CMOS, NMOS, or CCD. In some embodiments, the camera 103 may be an analog camera connected to an encoder. The illustrated camera 103 may be a 2D camera; however use of a structured light 3D camera, a time-of-flight 3D camera, a 3D Light Detection and Ranging (LiDAR) device, a stereo camera, or any other suitable type of camera within the security system 100 is contemplated.

The image sensor 109 may be operable to capture light in one or more frequency ranges. For example, the image sensor 109 may be operable to capture light in a range that substantially corresponds to the visible light frequency range. In other examples, the image sensor 109 may be operable to capture light outside the visible light range, such as in the infrared and/or ultraviolet range. In other examples, the camera 103 may have similarities to a "multi-sensor" type of camera, such that the camera 103 includes pairs of two or more sensors that are operable to capture light in different and/or same frequency ranges.

The camera 103 may be a dedicated camera. It will be understood that a dedicated camera herein refers to a camera whose principal features is to capture images or video. In some example embodiments, the dedicated camera may perform functions associated with the captured images or video, such as but not limited to processing the image data produced by it or by another camera. For example, the dedicated camera may be a security camera, such as any one of a pan-tilt-zoom camera, dome camera, in-ceiling camera, box camera, and bullet camera.

Additionally, or alternatively, the camera 103 may include an embedded camera. It will be understood that an embedded camera herein refers to a camera that is embedded within a device that is operational to perform functions that are unrelated to the captured image or video. For example, the embedded camera may be a camera found on any one of a laptop, tablet, drone device, smartphone, video game console or controller.

The camera 103 includes one or more processors 113, and one or more memory devices 115 coupled to the processors and one or more network interfaces. The memory device 115 can include a local memory (such as, for example, a random access memory and a cache memory) employed during execution of program instructions. The processor 113 executes computer program instructions (such as, for example, an operating system and/or application programs), which can be stored in the memory device 115.

In various embodiments the processor 113 may be implemented by any suitable processing circuit having one or more circuit units, including a digital signal processor (DSP), graphics processing unit (GPU) embedded processor, a visual processing unit or a vison processing unit (both referred to herein as "VPU"), etc., and any suitable combination thereof operating independently or in parallel, including possibly operating redundantly. Such processing circuit may be implemented by one or more integrated circuits (IC), including being implemented by a monolithic integrated circuit (MIC), an Application Specific Integrated Circuit (ASIC), a Field Programmable Gate Array (FPGA), etc. or any suitable combination thereof. Additionally or alternatively, such processing circuit may be implemented as a programmable logic controller (PLC), for example. The processor may include circuitry for storing memory, such as digital data, and may comprise the memory circuit or be in wired communication with the memory circuit, for example. A system on a chip (SOC) implementation is also common, where a plurality of the components of the camera 103, including the processor 113, may be combined together on one semiconductor chip. For example, the processor 113, the memory device 115 and the network interface of the camera 103 may be implemented within a SOC. Furthermore, when implemented in this way, a general purpose processor and one or more of a GPU or VPU, and a DSP may be implemented together within the SOC.

In various example embodiments, the memory device 115 coupled to the processor 113 is operable to store data and computer program instructions. The memory device 115 may be implemented as Read-Only Memory (ROM), Programmable Read-Only Memory (PROM), Erasable Programmable Read-Only Memory (EPROM), Electrically Erasable Programmable Read-Only Memory (EEPROM), flash memory, one or more flash drives, universal serial bus (USB) connected memory units, magnetic storage, optical storage, magneto-optical storage, etc. or any combination thereof, for example. The memory device 115 may be operable to store memory as volatile memory, non-volatile memory, dynamic memory, etc. or any combination thereof.

Continuing with FIG. 1, the camera 103 is coupled to the server system 108. In some examples, the camera 103 is coupled to the server system 108 via one or more suitable networks. These networks can include the Internet, or one or more other public/private networks coupled together by network switches or other communication elements. The network(s) could be of the form of, for example, client-server networks, peer-to-peer networks, etc. Data connections between the camera 103 and the server system 108 can be any number of known arrangements, examples of which were previously herein detailed. In at least one example embodiment, the camera 103 and the server system 108 are within the same Local Area Network (LAN). In some examples, the camera 103 may be coupled to the server system 108 in a more direct manner than as described above. The camera 103 by itself or in combination with the server system 108 is configured to carry out classification of a type that, by virtue of the image data being generated, may be of a finer granularity as compared to classification from radar devices herein described.

The illustrated security system 100 also includes at least one radar device 192, which is coupled to the server system 108. In some examples, the radar device 192 is coupled to the server system 108 via one or more suitable networks. These networks can include the Internet, or one or more other public/private networks coupled together by network switches or other communication elements. The network(s) could be of the form of, for example, client-server networks, peer-to-peer networks, etc. Data connections between the radar device 192 and the server system 108 can be any number of known arrangements, examples of which were previously herein detailed. In at least one example embodiment, the radar device 192 and the server system 108 are within the same Local Area Network (LAN). In some examples, the radar device 192 may be coupled to the server system 108 in a more direct manner than as described above. Furthermore, although only one radar device 192 is shown in FIG. 1 for convenience of illustration, it will be understood that any suitable number of radar devices 192 may be included within the security system 100.

The illustrated radar device 192 includes a detector module 193, a wireless transmitter/receiver ($t_x/r_x$) 194, a processor 195 and a memory device 196. The wireless $t_x/r_x$ 194 generates and receives radio waves and includes the antenna part of the radar device 192. Where the wireless $t_x/r_x$ 194 is a multichannel transceiver, the radar device 192 can be configured to measure both distance and angle. Regarding the detector module 193, it converts the radio waves into useful information which includes information regarding detected objects. The processor 195 controls overall operation of the radar device 192, which is coupled to the memory device 196 which in turn may store sensed signals and sensing rules, noting that the radar device 192 may collect unprocessed raw radar data including, but not limited to, raw reflectivity, radial velocity, spectrum width data, and distance information. Such data, which is raw and unprocessed, will be expected to contain noise. Based on environmental conditions this collected data may also contain multiple reflections. As understood by those skilled in the art, algorithms are used to process this collected data into a form that is cleaner before then employing further algorithms (for example, calculating a 3D point cloud). A data format that is suitable may be, for instance, one that is similar to NEXRAD Level II Data provided by National Weather Service (an agency of the United States federal government).

As understood by those skilled in the art, the radar device 192 may implement sensing based on active and applicable sensing rules. For example, the rules may cause the radar device 192 cease sensing during given periods such as, for example, those associated with inactivity, and carry out sensing at other periods such as, for example, those associated with activity. The radar device 192 by itself or in combination with the server system 108 is configured to carry out classification of a type that, by virtue of the radar data being generated, may be of a coarser granularity as compared to classification from camera devices herein described. In at least one non-limiting example, the radar device 192 is mmWave radar device configured to enable object tracking based on generated point cloud information and associated clustering as will be understood by those skilled in the art.

Figure 3A:
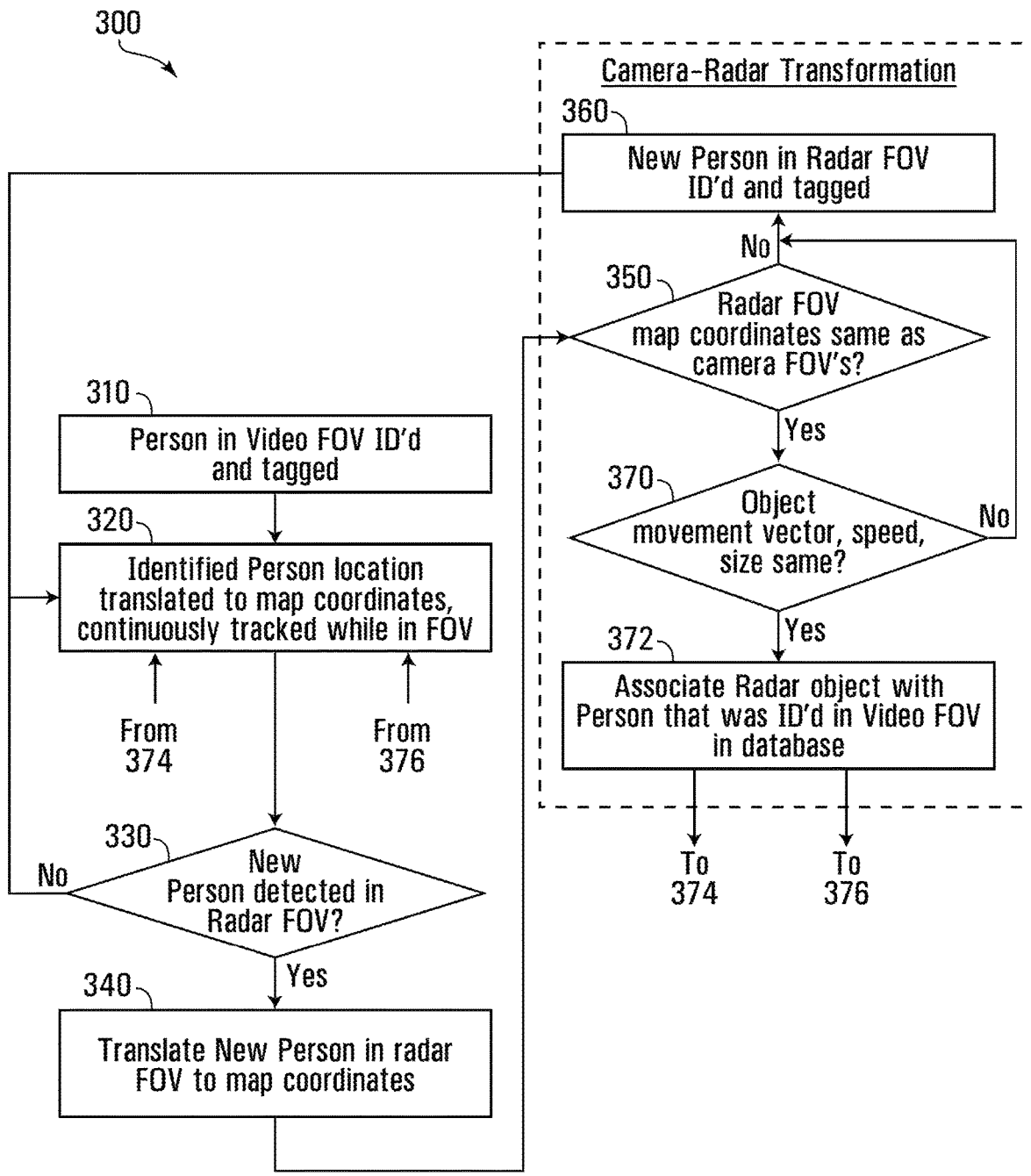
FIGS. 3A-3B are collectively a flow chart illustrating a method for intelligent tracking and data transformation between different types of sensor devices in accordance with an example embodiments.
Figure 3B:
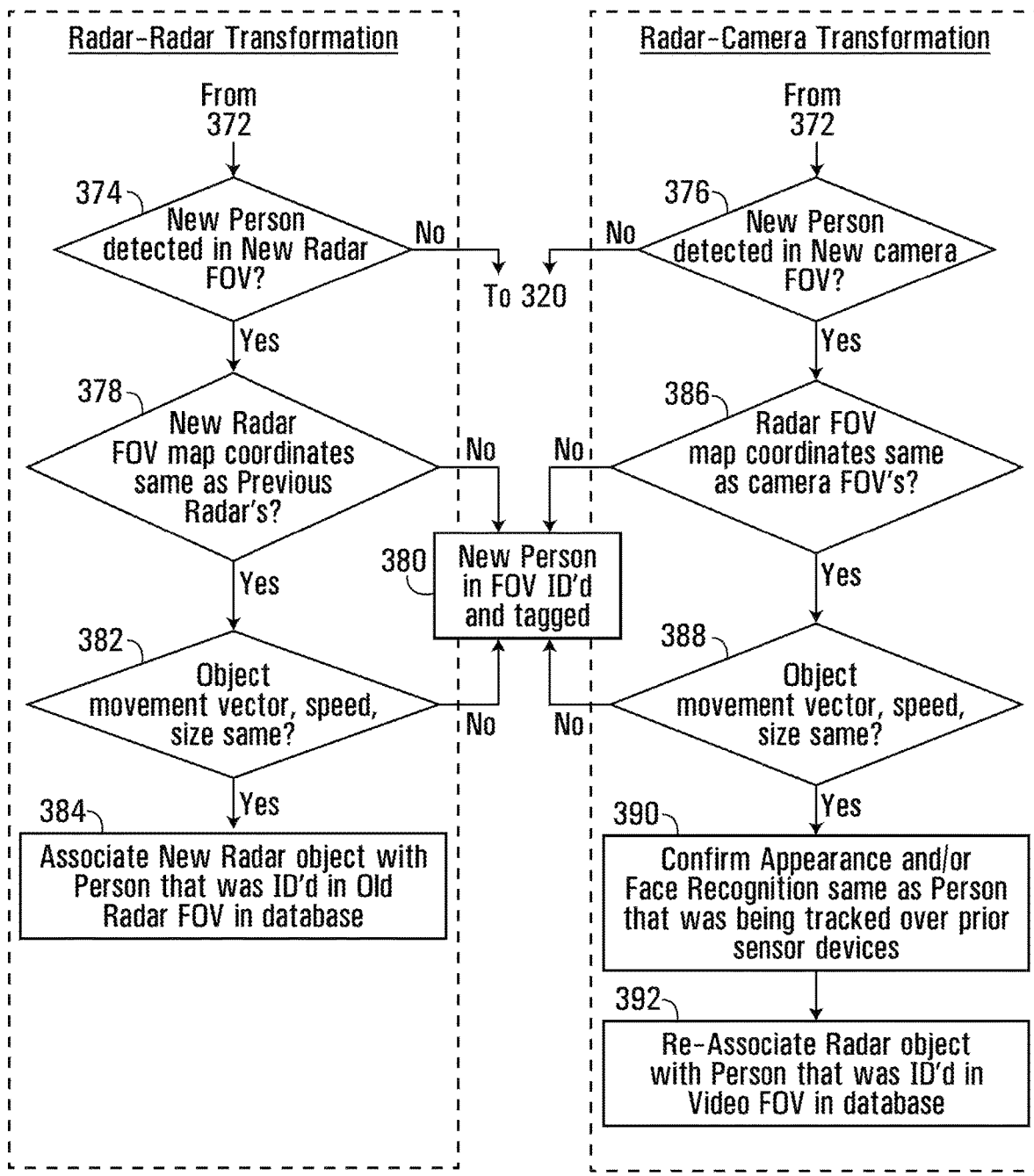
Figure 4:
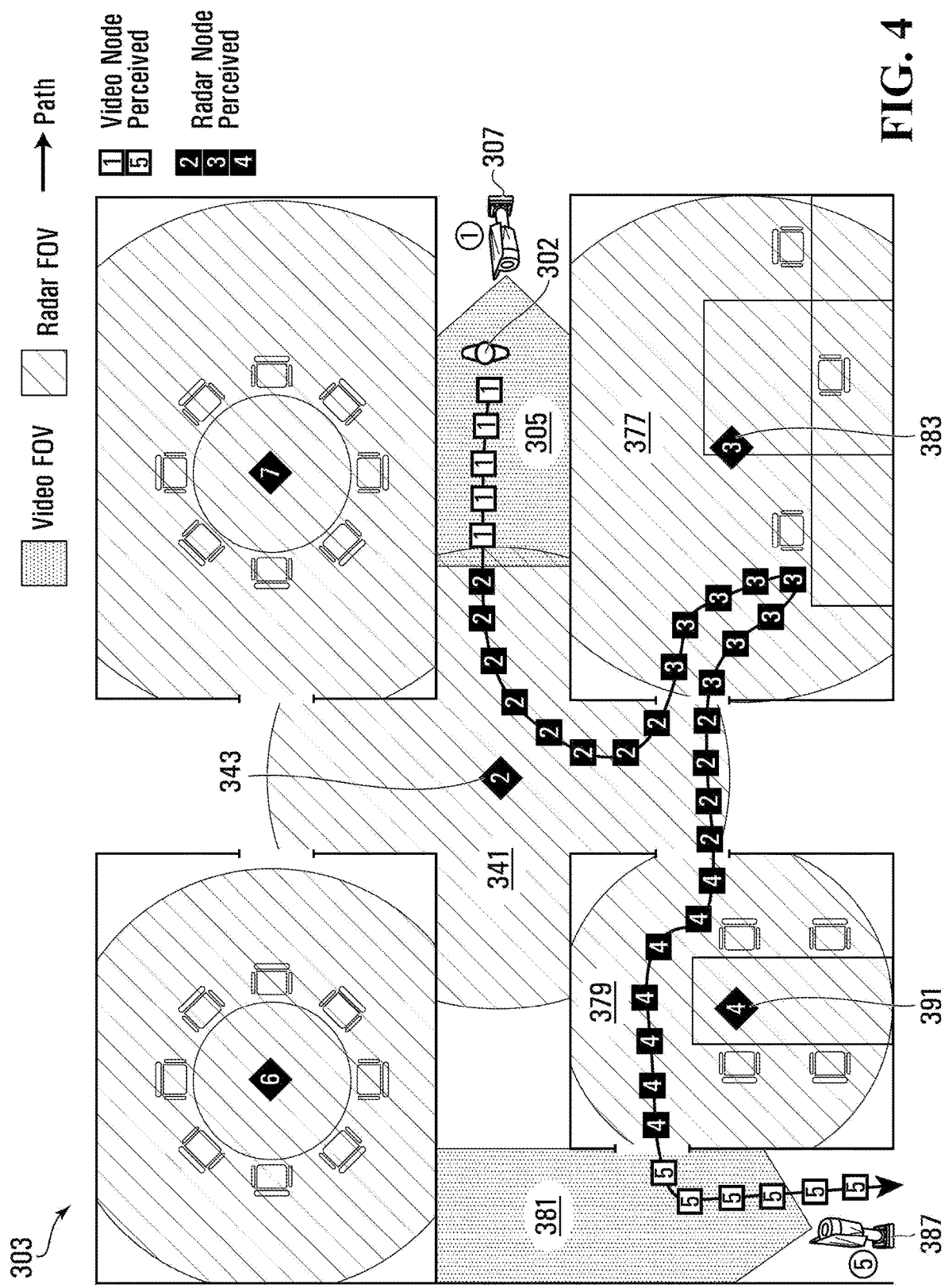
FIG. 4 is a diagram illustrating additional example details related to the example embodiments of FIGS. 3A-3B.

Reference is now made to FIGS. 3A-3B and 4. FIGS. 3A-3B are collectively a flow chart of a method 300 in accordance with example embodiments, and FIG. 4 is a diagram illustrating additional example details in relation to these. In connection with FIG. 4, cameras and radar devices illustrated therein may each be similar or the same as the camera 103 and the radar device 192 respectively, that were previously herein described (and thus premises 303 may be understood to include some or all of the security system 100 of FIG. 1). Also, in accordance with a number of example embodiments, the tracking and transformation module 199 within the server system 108 (FIG. 1) is configured to implement part or all of the method 300, and the object tracking UI module 224 (FIG. 2) is configured to provide complementary control of object tracking and display thereof on the display 126 of the computer terminal 104 (FIG. 1).

At a beginning of the method 300 shown in FIGS. 3A-3B, a person 302 is located in the premises 303, within a Field Of View (FOV) 305 of a camera device 307, and is therein identified and tagged (310). Next, while being continuously tracked in the FOV 305 of the camera device 307, the location of the identified person 302 is translated (320) to map coordinates. Next a radar device adjacent the camera device 307 (or other suitable node within the network of the security system) checks (330) whether a new person has been detected within the radar device's FOV (for example, calibrated coverage area). If no, the action 320 follows.

Still with reference to the decision action 330, if a new person has been detected within a radar device's FOV (i.e. "yes"), then the new person in the radar device's FOV is translated (340) into respective map coordinates. (Referring to FIG. 4, this scenario corresponds to the person 302 moving from the FOV 305 of the camera device 307 to FOV 341 of radar device 343 as illustrated by, for example, the "1" labelled squares changing to "2" labelled squares.)

Continuing on in the method 300, the radar device 343 (or other suitable node within the network of the security system) checks (350) whether the map coordinates corresponding to the entrance point of the object within the FOV 341 of the radar device 343 match those corresponding to the exit point of the person 302 from the FOV 305 of the camera device 307. If "no", then the object that just entered into the FOV 341 of the radar device 343 is determined to be a new person, and that new person is identified and tagged (360). Alternatively if "yes" (i.e. there is a match), then next match checking (370) follows including, for example, comparison of object movement vector, speed and size, coarse classification as across opposite sides of the camera-radar FOV divide. If there is no match, then the action 360 follows; however if there is a match, then the radar object is associated (372), in a respective database (such as, for example, the one or more database 191 shown in FIG. 1, a database provided at the edge-device, etc.) with the person 302 that was identified previously as present within the FOV 305 of the camera device 307. In some examples, the server system 108 is configured to create a global ID for a global object which has been identified as present, at different times, in FOVs of two different sensor devices. In this manner a plurality of local object IDs may be associated in the database 191 with a global IDs. Further details in relation to integrating a plurality of local maps and identifications into a global mapping and identification are described in, for example, US Pat. Publ. No. 2019/0333233 entitled "Method and System for Tracking an Object-of-Interest Without Any Required Tracking Tag Thereon".

Also contemplated as included in the action 372 is further updating the track corresponding to the identified person 302, including employing the newly obtained metadata to effect appending and transformation of the previous metadata defining the track (i.e. the newly obtained metadata and the previous metadata are included together in the track as transformed hybrid data).

Following the associating action 372, either a first branch starting with decision action 374 follows, or a second branch starting with decision action 376 follow. The first branch corresponds to a radar-radar transformation scenario (for example, the person 302 moving from the radar FOV 341 to a different radar FOV 377), whereas the second branch (as contrasted to the first branch) corresponds to a radar-camera transformation scenario (for example, the person 302 moving from a radar FOV 379 to a camera FOV 381), In the case of decision action 374, if no new person is detected within the new radar device's FOV, then the action 320 follows; however if in fact a new person is detected within the new radar device's FOV, then decision action 378 follows. With respect to the decision action 378, radar device 383 (or other suitable node within the network of the security system) checks whether the map coordinates corresponding to the entrance point of the object within the FOV 377 of the radar device 383 match those corresponding to the exit point of the person 302 from the FOV 341 of the radar device 343 (i.e. the previous radar device's FOV). If "no", then the object that just entered into the FOV 377 of radar device 383 is determined to be a new person, and that new person is identified and tagged (380). Alternatively if "yes" (i.e. there is a match), then next match checking (382) follows including, for example, comparison of object movement vector, speed and size and coarse classification as across opposite sides of the radar-radar transformation divide. If there is no match, then the action 380 follows; however if there is a match, then the new radar object is associated (384), in a respective database, with the person 302 that was previously identified while being present within the FOV 341 of the radar device 343. Also contemplated as included in the action 384 is further updating the track corresponding to the identified person 302, including employing the newly obtained metadata to effect appending and transformation of the previous metadata defining the track.

In the case of the decision action 376, if no new person is detected within the new camera device's FOV, then the action 320 follows; however if in fact a new person is detected within the new camera device's FOV, then decision action 386 follows. With respect to the decision action 386, the camera 387 (or other suitable node within the network of the security system) checks whether the map coordinates corresponding to the entrance point of the object within the FOV 381 of camera device 387 match those corresponding to the exit point of the person 302 from the FOV 379 of radar device 391. If "no", then the object that just entered into the new camera device's FOV is determined to be a new person, and that new person is identified and tagged (380). Alternatively if "yes" (i.e. there is a match), then next match checking (388) follows including, for example, comparison of object movement vector, speed and size and coarse classification as across opposite sides of the FOV divide. If there is no match, then the action 380 follows; however if there is a match, then first facial recognition and/or appearance search is carried out (390) to confirm that the new video object is the same person (i.e. the person 302) that was being tracked over prior sensor devices (for example, one or more of the neural network(s) 197 and 198 shown in FIG. 1 may be employed). Following the action 390, re-association is carried out (392). More specifically, the radar object is re-associated (in the respective database) with the person 302 that was identified in the video FOV. As was the case in connection with the previously described action 384, the action 392 can also include further updating the track corresponding to the identified person 302, including employing the newly obtained metadata to effect appending and transformation of the previous metadata defining the track.

Variations on the illustrated actions 390 and 392 are contemplated. For example, appearance search and/or facial recognition can be selectively carried out based on a confidence value calculated in relation to the match. For instance, the system could limit carrying out the action 390 to only those instances where the confidence value is below say 70% (any suitable percentage between 50% and 99% is contemplated). So in the case of only a 60% confidence in match, the action 390 would be carried out, but in the case of a higher 80% confidence in match, the action 390 would not be carried out. It is also contemplated that appearance search and/or facial recognition could potentially change an initial match determination (i.e. based on confidence values calculated prior to the action 390). Say a match confidence value as between $object_x$ in the previous radar sub-system and $object_a$ in the camera sub-system is 60%, but there is say there is also another match confidence value of 50% as between object), in the previous radar sub-system and $object_b$ in the camera subsystem. Then say appearance search and/or facial recognition is first carried out as between images of $object_x$ and $object_a$. The appearance search and/or facial recognition then contradicts the existence of match, so the appearance search and/or facial recognition is run again, but this time as between images of object), and $object_b$. In such a manner appearance search and/or facial recognition may change an initial match determination to a different one (assuming appearance search and/or facial recognition of the subsequent round find a match where the first round did not).

As should be apparent from this detailed description, the operations and functions of the electronic computing device are sufficiently complex as to require their implementation on a computer system, and cannot be performed, as a practical matter, in the human mind. Electronic computing devices such as set forth herein are understood as requiring and providing speed and accuracy and complexity management that are not obtainable by human mental steps, in addition to the inherently digital nature of such operations (e.g., a human mind cannot interface directly with RAM or other digital storage, cannot transmit or receive electronic messages, video, audio, etc., and cannot simultaneously process and compare multiple video streams simultaneously, among other features and functions set forth herein).

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "one of", without a more limiting modifier such as "only one of", and when applied herein to two or more subsequently defined options such as "one of A and B" should be construed to mean an existence of any one of the options in the list alone (e.g., A alone or B alone) or any combination of two or more of the options in the list (e.g., A and B together).

A device or structure that is "configured" in a certain way is configured in at least that way, but may also be configured in ways that are not listed.

The terms "coupled", "coupling" or "connected" as used herein can have several different meanings depending in the context in which these terms are used. For example, the terms coupled, coupling, or connected can have a mechanical or electrical connotation. For example, as used herein, the terms coupled, coupling, or connected can indicate that two elements or devices are directly connected to one another or connected to one another through an intermediate elements or devices via an electrical element, electrical signal or a mechanical element depending on the particular context.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Any suitable computer-usable or computer readable medium may be utilized. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. In the context of this document, a computer-usable or computer-readable medium may be any medium that can contain, store, communicate, propagate, or transport the program for use by or in connection with the instruction execution system, apparatus, or device.

Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. For example, computer program code for carrying out operations of various example embodiments may be written in an object oriented programming language such as Java, Smalltalk, C++, Python, or the like. However, the computer program code for carrying out operations of various example embodiments may also be written in conventional procedural programming languages, such as the "C" programming language or similar programming languages. The program code may execute entirely on a computer, partly on the computer, as a stand-alone software package, partly on the computer and partly on a remote computer or server or entirely on the remote computer or server. In the latter scenario, the remote computer or server may be connected to the computer through a local area network (LAN) or a wide area network (WAN), or the connection may be made to an external computer (for example, through the Internet using an Internet Service Provider).

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method comprising:
   generating radar data to track a movement of an identified object, within a coverage area of a calibrated radar device, during a period of time;
   upon detection that the identified object is crossing or has crossed a boundary, updating a track to add radar metadata in respect of the identified object;
   after detecting that the identified object is within a field of view of a calibrated camera device, generating additional metadata that is:
      generated from image data produced by the calibrated camera device, and
      different than the radar metadata, at least in respect of an object classification data component of each the radar metadata and the additional metadata; and
   further updating the track to include:
      both the radar metadata and the additional metadata together, and
      an object-related recognition result in relation to the identified object within the image data.

2. The method of claim 1 wherein the object-related recognition result is a facial recognition result.

3. The method of claim 1 wherein the calibrated radar device is spaced apart from the calibrated camera device.

4. The method of claim 1 wherein the object classification data component of the radar metadata corresponds to a radar-based classification of a coarser granularity than a camera-based classification corresponding to the object classification data component of the additional metadata.

5. The method of claim 1 wherein the further updating the track to include both the radar metadata and the additional metadata together comprises further updating the track to include transformed hybrid data.

6. The method of claim 1 wherein the track is contained in a database within storage.

7. The method of claim 6 wherein the storage is within a server system.

8. The method of claim 6 wherein the database is provided at an edge-device.

9. The method of claim 1 wherein the calibrated radar device and the calibrated camera device are configured to provide, in combination during respective periods of operation, a camera-radar Field Of View (FOV) divide.

10. A system comprising:
a calibrated radar device configured to generate radar data to track a movement of an identified object, within a coverage area of the calibrated radar device, during a period of time;
a calibrated camera device configured to generate image data;
at least one processor communicatively coupled to the calibrated radar device and the calibrated camera device; and
at least one electronic storage medium storing program instructions that when executed by the at least one processor cause the at least one processor to perform:
updating, upon detection that the identified object is crossing or has crossed a boundary, a track to add radar metadata in respect of the identified object;
generating, after detection that the identified object is within a Field Of View (FOV) of the calibrated camera device, additional metadata that is:
generated from the image data, and
different than the radar metadata, at least in respect of an object classification data component of each the radar metadata and the additional metadata; and
further updating the track to include:
both the radar metadata and the additional metadata together, and
an object-related recognition result in relation to the identified object within the image data.

11. The system of claim 10 wherein the object-related recognition result is a facial recognition result.

12. The system of claim 10 wherein the calibrated radar device is adapted to be spaced apart from the calibrated camera device.

13. The system of claim 10 wherein the object classification data component of the radar metadata corresponds to a radar-based classification of a coarser granularity than a camera-based classification corresponding to the object classification data component of the additional metadata.

14. The system of claim 10 wherein the further updating the track to include both the radar metadata and the additional metadata together comprises further updating the track to include transformed hybrid data.

15. The system of claim 10 wherein the track is contained in a database within storage.

16. The system of claim 15 wherein the database is provided at an edge-device of the system.

17. The system of claim 10 wherein the calibrated radar device and the calibrated camera device are configured to provide, in combination during respective periods of operation, a camera-radar Field Of View (FOV) divide.

* * * * *